United States Patent [19]

Purcell

[11] Patent Number: 5,484,248

[45] Date of Patent: Jan. 16, 1996

[54] ENDLESS TRACK TRANSPORTER FOR SEMI-TRAILERS

[75] Inventor: Robert J. Purcell, Washington, Ill.

[73] Assignee: Caterpillar Inc., Peoria, Ill.

[21] Appl. No.: 325,755

[22] Filed: Oct. 20, 1994

[51] Int. Cl.$^6$ .................................................. B60P 3/00
[52] U.S. Cl. ...................... 414/458; 414/495; 414/498
[58] Field of Search ........................... 414/495, 498, 414/458, 340

[56] References Cited

U.S. PATENT DOCUMENTS

| | | | |
|---|---|---|---|
| 2,834,599 | 5/1958 | Sarchet | 414/498 X |
| 2,875,839 | 3/1959 | Spinks, Jr. | 414/498 X |
| 2,897,989 | 8/1959 | Hounsell | 414/458 |
| 3,521,773 | 7/1970 | Geister | 414/498 X |
| 3,529,736 | 9/1970 | Lebre | 414/458 |
| 4,232,879 | 11/1980 | Boxrud | 414/458 X |
| 4,915,577 | 4/1990 | Fraser | 414/495 X |
| 5,074,733 | 12/1991 | Hennig | 414/495 X |

Primary Examiner—David A. Bucci
Attorney, Agent, or Firm—Frank L. Hart

[57] ABSTRACT

An endless track transporter is provided moving the semi-trailer of an on-highway wheeled tractor-trailer over terrain where it is desirable to exert low ground pressure. The transporter has a gate system which is controllably moveable for clearing the landing gear of the semi-trailer during hitching of the transporter to the semi-trailer.

8 Claims, 1 Drawing Sheet

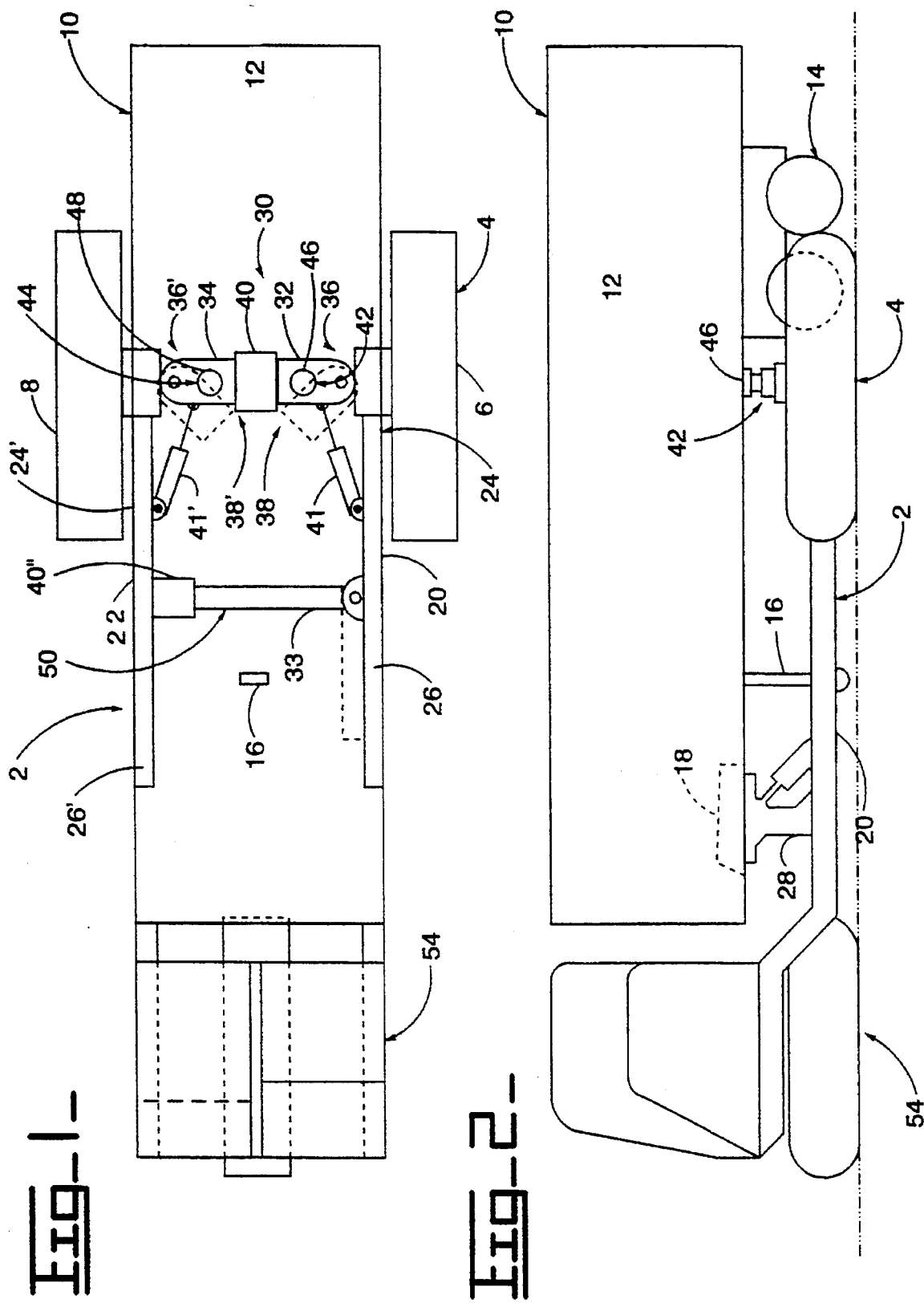

5,484,248

ENDLESS TRACK TRANSPORTER FOR SEMI-TRAILERS

TECHNICAL FIELD

The present invention relates to a transporter or trailer for loading and moving an on-highway wheeled semi-trailer of a tractor-trailer vehicle.

BACKGROUND ART

In the agricultural art, it has been conclusively proven that ground compaction seriously, detrimentally affects the yield of crops. During the harvest of several type crops, it is desirable to load the crops directly into an on-highway trailer of a semi-trailer which has wheels. Such loading systems avoid excessive handling of the crop being harvested, but have a decided drawback of seriously compacting the ground after a heavy load is placed on the semi-trailer. Further, during wet weather, the semi-trailers are often prevented from entering the fields for fear of leaving deep ruts in the fields and or becoming stuck in the mud. This is a most serious problem in irrigated fields where careful control of the ground elevation is important.

The subject invention is directed to an endless track trailer or transporter which is of a construction to easily load an on-highway semi-trailer thereonto and transport the semi-trailer through the agricultural field, thereby overcoming one or more of the problems as set forth above.

DISCLOSURE OF THE INVENTION

An endless track transporter for an on-highway semi-trailer is provided. The semi trailer has a body, rearwardly positioned wheels, a forwardly positioned landing gear and a more forwardly positioned hitch assembly.

First and second spaced apart supporting beams, each of which has a rearward and forward portion, said supporting beams have a hitch assembly connected to their forward portion. The hitch assembly is mateable with the on-highway semi-trailer hitch.

First and second endless track systems are each positioned on an opposed side of a respective supporting beam. A gate-supporting axle system has first and second portions with each gate portion having first and second end portion. The first end portion of each gate portion is pivotally connected to a rearward portion of a respective supporting beam and is pivotally moveable between a first position at which the second end portion of each gate portion are in lockable engagement with one another and defining a support extending transversely between the supporting beams and a second position at which said second end portions are spaced one from the other a distance greater than the width of the landing gear 16 of the semi-trailer 10 expected to be loaded on the transporter 2. Means is provided for releasably locking the second end portions of the gate portions one to the other.

First and second lifting jacks, each having a supporting member, are connected to a respective gate portion. Each supporting member is moveable between a lowered position at which the supporting members are at an elevation less than the lower most height of a semi-trailer body expected to be transported and a raised position at which the supporting members are in contact with the semi-trailer body and said semi-trailer body is elevated.

BRIEF DESCRIPTION OF THE DRAWINGS

FIG. 1 is a diagrammatic top view in partial section of the transporter of this invention and a semi-trailer loaded thereon; and FIG. 2 is a side view of the embodiment of FIG. 1.

BEST MODE FOR CARRYING OUT THE INVENTION

Referring to FIGS. 1 and 2, a transporter 2 having an endless track system 4 consisting of first and second endless track systems or assemblies 6,8 is provided for loading a semi-trailer 10 of an on-highway wheeled tractor-trailer thereon and transporting the semi-trailer 10. The subject invention transporter 2 is particularly useful in the agricultural art where ground compaction is detrimental.

The semi-trailer 10 has a body 12, rearwardly positioned wheels 14, a forwardly positioned landing gear 16 for supporting the semi-trailer when the prime mover is separated from the semi-trailer 10, and a more forwardly positioned hitch assembly 18, as are well known in the art.

First and second spaced apart supporting beams 20,22 define the major framework of the transporter 2 of this invention. The supporting beams 20,22 each extend substantially parallel one to the other and have rearward and forward portions 24,24';26,26' and are connected one to the other.

A hitch assembly 28 is connected to the forward portions 26,26' of the first and second supporting beams 20,22. The transporter hitch assembly 28 is mateable with the hitch portion 18 of the on-highway semi-trailer 10.

The first and second endless track systems 6,8 are each positioned on an opposed side of a respective supporting beam 20,22 rearward portion 24,24'. At these positions, the track systems 6,8 are connected to the supporting beams 20,22 with said beams 20,22 positioned between the track systems 6,8.

A gate-supporting system 30, preferably having first and second portions 32,34, are each pivotally connected to a respective rearward portion 24,24' of a respective supporting beam 20,22. Each gate portion 32,34 of this preferred gate supporting system 30 has respective first and second end portions 36,36';38,38'. The first end portion 36,36' of each respective gate portion 32,34 is pivotally connected to a respective rearward portion 24,24' of a respective supporting beam 20,22 and is pivotally moveable between a first position, shown in FIG. 1 by solid lines, at which the second end portion 38,38' are in lockable engagement with one another and defining a support extending transversely between the supporting beams 20,22 and a second position (shown by broken lines) at which the second end portions 38,38' are spaced one from the other.

Means 40, such as an electrically or hydraulically actuated lock is connected to the second end portions 38,38' of the gate portions 32,34 for releasably securing the gate portions 32,34 to one another.

First and second lifting jacks 42,44 each have a respective supporting member 46,48. Each jack 42,44 is connected to a respective gate portion 32,34 at a location between the endless track systems 6,8. Each supporting member 46,48, in response to control from a remote location, is moveable between a first or lowered position at which the supporting members 46,48 have an elevation less than the lower most height of a semi-trailer body 12 expected to be transported and a raised position at which the supporting members 46,48 are in contact with the semi-trailer body 12 and said semi-trailer body 12 is at a higher elevation at which the semi-trailer wheels 14 are spaced from the ground.

In a preferred embodiment, the jacks 42,44 are hydraulically controlled from a remote location and the jacks 42,44 are each positioned adjacent a longitudinal middle portion of their respective endless track system 6,8. The preferred location for control of the moveable elements of the transporter 2 is in a prime mover 54 that will be towing the transporter 2. The prime mover 54 is also preferably an endless track vehicle.

In another construction of the transporter 2, as shown in FIG. 1, there are a plurality of spaced apart gate-supporting systems 30,50 each pivotally connected to their respective supporting beam 20,22 and being pivotally moveable between a first position at which the gate systems 30,50 extend generally transverse the beams 20,22 and a second position at which the gate systems 30,50 are angularly oriented relative to an associated beam 20,22. As can be seen by a study of the drawings, the gate system 50 is of unitary construction. It should be understood that both gate systems 30,50 can be of unitary construction so long as their pivotal movement is of such dimensions that the transporter 2 can be backed under the semi-trailer and the landing gear 16 of the semi-trailer 10 passes unimpeded between the gate systems 30,50 and adjacent beams 20,22. Preferably, the gate system 30 is of two piece construction. First and second hydraulic cylinders 41,41' are each pivotally connected on one end to a respective supporting beam 20,22 and on the other end to a respective gate portion 32,34. The cylinders 41,41' are actuatable from a remote location for controlled movement of the gate portions 32,34 between their first and second positions.

For purposes of brevity, the controls of the hydraulic and/or electrical components are not shown at their position in the prime mover 54. Such controls are well known in the art.

INDUSTRIAL APPLICABILITY

In the operation of the transporter 2 of this invention, an on-highway semi-trailer truck 10 will lower the semi-trailer landing gear 16, unhitch and the on-highway prime mover will move off. An operator will then back the transporter 2 under the semi-trailer 10 and hitch up to the transporter 2. During the backing operations, the landing gear 16 passed between the supporting beams 20,22 and the pivotally moveable gate system 30 and/or 50 which were at their second or open position.

The operator then actuates the hydraulic cylinders 41,41' of the gate system 30 and/or 50 which moves the gate portion 33 or portions 32,34 to their first or closed position and locks them at this position. The jacks 42,44 are then actuate and the semi-trailer 10 is raised by the jacks 42,44 until the wheels 14 are spaced from the ground.

In this condition, the operator can move the semi-trailer 10 through a field for loading while having low ground pressure endless track 4 of the transporter 2 and prime mover 54 in contact with the ground.

Other aspects, objects and advantages of this invention can be obtained from a study of the drawings, the disclosure and the appended claims.

I claim:

1. An endless track transporter for an on-highway semi-trailer having a body, rearwardly positioned wheels, a forwardly positioned landing gear and a more forwardly positioned hitch assembly, comprising:

first and second spaced apart supporting beams, each beam having a rearward portion and a forward portion;

a hitch assembly connected to the forward portion of the first and second supporting beams and being mateable with the on-highway semi-trailer hitch;

first and second endless track systems, each positioned on an opposed side of a respective supporting beam rearward portion with said supporting beams being positioned between said track systems and respectfully connected thereto;

a gate system having first and second portions with each gate portion having first and second end portions, said first end portion of each gate portion being pivotally connected to a rearward portion of a respective supporting beam and being pivotally moveable between a first position at which the second end portion of each gate portion are in lockable engagement with one another and defining a support extending transversely between the supporting beams and a second position at which said second end portions are spaced one from the other;

means for releasably locking the second end portions of the gate portions one to the other; and first and second lifting jacks each having a supporting member and each jack being connected to a respective gate portion at a location adjacent a respective endless track system and each supporting member being moveable between a lowered position at which the supporting members have an elevation less than the lower most height of a semi-trailer body expected to be transported and a raised position at which the supporting members are in contact with the semi-trailer body and said semi-trailer body is elevated by said jacks to an elevation at which the semi-trailer wheels are spaced from the ground.

2. A transporter, as set forth in claim 1, wherein the jacks are hydraulic jacks operable from a remote location.

3. A transporter, as set forth in claim 1, wherein the jacks are each positioned adjacent a longitudinal middle portion of their respective endless track system.

4. A transporter, as set forth in claim 1, wherein there are a plurality of spaced apart gate systems each being pivotally connected to their respective supporting beam and being pivotally moveable between a first position at which the gate systems extends generally transverse the beams and a second position at which the gate systems are spaced one from the other and angularly oriented relative to an associated beam.

5. A transporter, as set forth in claim 1, wherein the means for locking the gate portions are one of an electrically and hydraulically actuated lock actuatable from a remote location.

6. A transporter, as set forth in claim 5, including first and second hydraulic cylinders each pivotally connected at one end to a respective supporting beam and at the other end to a respective gate portion and being actuatable from a remote location for controlled movement of the gate portions between their first and second positions.

7. A transporter, as set forth in claim 1, wherein at the raised position of the semi-trailer, said semi-trailer is supported by the first and second jack supporting members and the hitch assembly.

8. A transporter, as set forth in claim 1, wherein at the second position of the gate system portions, the gate portions are spaced one from the other a distance greater than the width of the landing gear of the semi-trailer expected to be loaded on the transporter.

* * * * *